United States Patent [19]

Takahashi et al.

[11] Patent Number: 5,079,091
[45] Date of Patent: Jan. 7, 1992

[54] GREEN COMPACT OF INCINERATION ASHES OF SEWERAGE SLUDGE AND ITS BURNED PRODUCT

[75] Inventors: Shiro Takahashi, Hashimoto; Kazuki Taniguchi, Minamikawachi; Hiroyuki Kawagishi, Nishinomiya; Ryoji Kawamura, Nara, all of Japan

[73] Assignee: Chugai Ro Co., Ltd., Osaka, Japan

[21] Appl. No.: 568,147

[22] Filed: Aug. 3, 1990

Related U.S. Application Data

[62] Division of Ser. No. 414,386, Sep. 29, 1989, Pat. No. 4,997,711.

[51] Int. Cl.$^5$ .................................................. C10L 5/46
[52] U.S. Cl. ........................................ 428/357; 156/89; 264/29.1; 264/DIG. 69; 428/2; 428/49; 428/340; 428/903.3
[58] Field of Search ............... 428/2, 49, 357, 340, 428/903.3; 156/89; 264/29.1, DIG. 69

[56] References Cited

U.S. PATENT DOCUMENTS

| | | | |
|---|---|---|---|
| 3,801,358 | 4/1974 | Steinberg et al. | 428/2 X |
| 4,352,856 | 10/1982 | Smillie | 428/403 X |
| 4,940,611 | 7/1990 | Burnet et al. | 428/2 |

Primary Examiner—Henry F. Epstein
Attorney, Agent, or Firm—Wenderoth, Lind & Ponack

[57] ABSTRACT

According to the present invention, incineration ashes of sewerage sludge are compacted with pressure, but without additives, to have the bulk specific gravity of 0.9–2.5. Since the green compact has sufficient strength and reduced volume in comparison with the incineration ashes before compacting, it enables mass dumping without causing secondary pollution. Moreover, if the green compact is fired to have the bulk specific gravity of 1.4–3.5, both the volume and weight are reduced much more, realizing easy handling of the resulted burned product.

2 Claims, 1 Drawing Sheet

GREEN COMPACT OF INCINERATION ASHES OF SEWERAGE SLUDGE AND ITS BURNED PRODUCT

This is a divisional application of Ser. No. 07/414,386, filed Sept. 29, 1989 now U.S. Pat. No. 4,997,711.

BACKGROUND OF THE INVENTION

1. Field of the Invention

The present invention relates to a green compact of incineration ashes of sewerage sludge and its burned product.

2. Description of the Prior Art

At present, the sewerage sludge is generally dumped out in any one of the following manners after it is once incinerated in a incinerator. Specifically, a) The incineration ashes of the sewerage sludge taken out of an ash hopper are, as they are or after they are added with moisture, thrown away at a reclaimed dump.

b) The incineration ashes are mixed with cement or lime, etc., granulated into particles, solidified, and finally thrown away at a reclaimed dump.

c) The incineration ashes are melted in a melting furnace, cooled, ground, and thereafter thrown away at a reclaimed dump, or utilized as an aggregate of concrete.

According to the method a), however, the volume of the incineration ashes become large per unit weight, resulting in a short span of service time of the reclaimed dump. Moreover, when the incineration ashes after they are thrown away are exposed to weather, they may be scattered into an outflow, and particularly, if the incineration ashes contain a heavy metal therein, the melting of the metal would be a cause of secondary pollution. Accordingly, the method a) cannot be said to be suitable from the viewpoint of environmetal sanitation.

On the other hand, according to the method b), although the disadvantages of the above-described method a) are solved, it is a drawback that the total amount of the incineration ashes to be thrown away is increased by the additives mixed in the incineration ashes so that the ashes are granulated and solidified.

Meanwhile, according to the method c), since the melting furnace is required for melting the incineration ashes, a special equipment therefor is necessary, with increasing the cost for operating the equipment.

In view of the above, the present inventors have examined the character of the incineration ashes of the sewerage sludge, and noted that the incineration ashes can be easily compressed to form a solid unit by force of van der Walls under the condition of high pressure, like as general powders.

SUMMARY OF THE INVENTION

Accordingly, an essential object of the present invention is to provide a green compact of incineration ashes of sewerage sludge and its burned product, with readily removing the above-described disadvantages inherent in the prior arts.

In accomplishing the above-described object, according to the present invention, solely the incineration ashes of sewerage sludge are so compacted with pressure that the bulk specific gravity thereof becomes 0.9-2.5. Further, according to another feature of the present invention, the green compact is so fired that the bulk specific gravity thereof becomes 1.4-3.5.

BRIEF DESCRIPTION OF THE DRAWINGS

This and other objects and features of the present invention will become apparent from the following description taken in conjunction with one preferred embodiment thereof with reference to the accompanying drawings, throughout which like parts are designated by like reference numerals, and in which.

DETAILED DESCRIPTION OF THE PREFERRED EMBODIMENT

Figure 1:
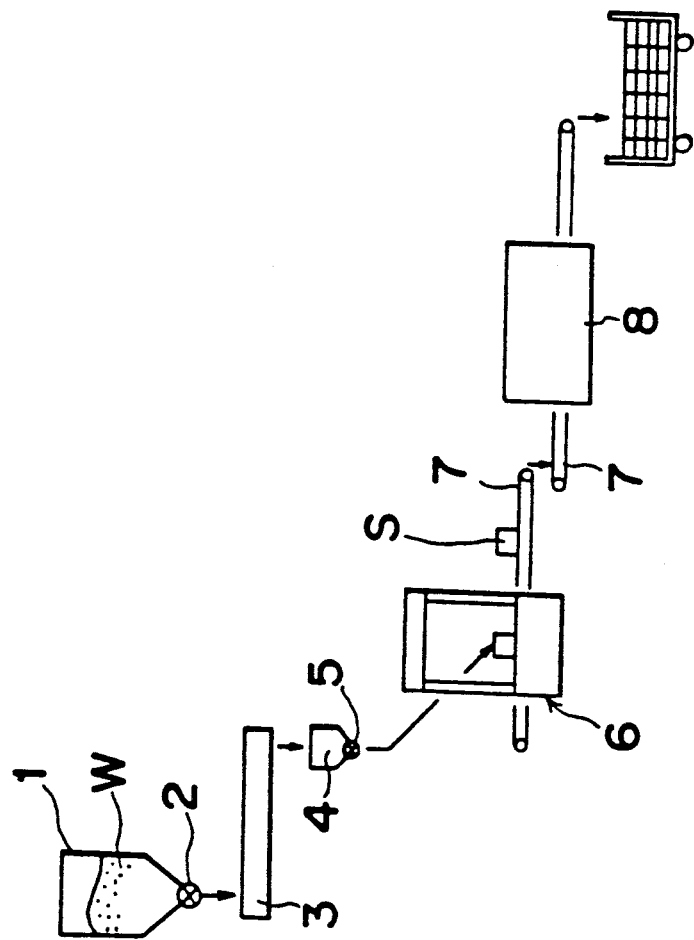
FIG. 1 is a flow-chart showing the manufacturing process of a green compact and a burned product of incineration ashes of sewerage sludge according to the present invention.

Referring to FIG. 1, incineration ashes of the sludge W in the form of powders or particles which has been incinerated in a well-known incinerator for sewerage sludge is stored in an ash hopper 1. The incineration ashes W are sent out from a quarrying device 2 to an ash feed hopper 4 via a conveyor 3. Then, the incineration ashes W in the hopper 4 are supplied every predetermined amount by a fixed amount feeder 5 to a powder compacting press 6, where the incineration ashes W are compacted with pressure of 0.3 t/cm$^2$–2.0 t/cm$^2$ into a predetermined configuration. A reference numeral 7 designates a conveyor.

Figure 2:
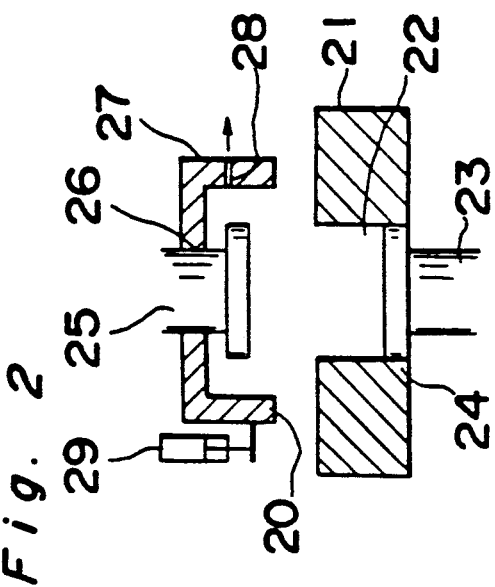
FIG. 2 is a schematic sectional view of a powder compacting press.

The construction of the above-mentioned powder compacting press 6 is shown in FIG. 2.

Referring to FIG. 2, the compacting press 6 is provided with a die 21 which has a packing section 22 in the central part thereof. The die 21 is movable in a longitudinal direction. The packing section 22 is fitted with a fixed lower punch 23 which is slidable with the die 21, through a seal packing (O ring) 24. An upper punch 25 is moved in the longitudinal direction by an operating means (not shown), and fitted in the packing section 22. The upper punch 25 is covered, through a seal packing (O ring) 26, with a slidable vacuum chamber 27 which is opened at the lower part thereof. The vacuum chamber 27 is able to be moved up and down by a cylinder 29 to be tightly adhered to the die 21 through a seal packing (O ring) 20. A discharge opening 28 formed in the vacuum chamber 27 is connected to a vacuum pump (not shown).

Accordingly, in the state as shown in FIG. 2, when the incineration ashes W are fed into the packing section 22 of the compacting press 6, both the upper punch 25 and the vacuum chamber 27 are descended. The vacuum chamber 27 is tightly adhered to the die 21, as mentioned before, by the cylinder 29 through the seal packing 20. When the upper punch 25 reaches the die 21, the incineration ashes W in the packing section 22 are pressed by the upper punch 25 while the pressure in the vacuum chamber 27 is continuously reduced by the vacuum pump.

After the pressing procedure is completed, the pressure within the vacuum chamber 27 is raising up to take out a green compact S.

The same process will be repeated.

As a result of the above process, such green compacts S are obtained as shown in Tables 1 and 2 while the pressing pressure of the compacting press 6 is changed.

It is to be noted here that among the types of the incineration ashes in Tables 1 and 2, type A and type B represent respectively as follows:

Type A: incineration ashes obtained by burning dehydrated cake which is obtained by applying calcic as an dehydrating agent, and composed of 20-50% CaO, 10-30% $SiO_2$, 5-15% $Al_2O_3$, and remaining others;

Type B incineration ashes obtained by burning dehydrated cake which is obtained by applying high molecular as an dehydrating agent, and composed of 3-10% CaO, 20-45% $SiO_2$, 10-20% $Al_2O_3$, and remaining others.

Moreover, in the item of the evaluation, symbol ○ means that the green compact S has the strength suitable for normal treatment, symbol Δ expressing that the green compact S is relatively short of strength, and symbol x that the green compact is short of strength. The green compact with symbol ○ has the volume 20-50% of the volume before pressing.

temperature of the green compact reaches a predetermined value not more than the softening point of the incineration ashes, and then gradually raised before the surface temperature exceeds the softening point.

By way of example, in the event that the green compact made of high polymer incineration ashes is fired, the furnace temperature is rapidly increased up to a predetermined temperature not more than the softening point of the incineration ashes of about 1000° C., e.g., approximately 900° C. Then, the furnace temperature is gradually raised (preferably by the speed not more than 200° C./h) before it passes the softening point, that is, approximately 1000° C. Thereafter, the furnace temperature is raised to a firing temperature by the same speed, so that the green compact is fired. As indicated in FIG. 3(b), it may be possible that after passing the softening point, the furnace temperature is again rapidly raised to the firing temperature, and in this state the green compact is fired.

If the furnace temperature is raised in the foregoing manner, the speed of the temperature rise is relatively slow since it reaches 900° C. until it passes 1000° C. Therefore, the inner temperature of the green compact

TABLE 1

| Type of ashes | Dimension before compacting (mm) | Pressing pressure (t/cm$^2$) | Dimension after compacting (mm) | Weight after compacting (g) | Bulk specific gravity of green compact | |
|---|---|---|---|---|---|---|
| $A_1$ | φ80 × 30 | 1 | φ80 × 11.5 | 90 | 1.557 | ○ |
| $A_2$ | φ100 × 47 | 0.5 | φ100 × 23 | 220 | 1.218 | ○ |
| $A_3$ | φ100 × 40 | 0.5 | φ100 × 20 | 180 | 1.146 | ○ |
| $A_4$ | φ80 × 30 | 2 | φ80 × 9 | 87 | 1.923 | ○ |
| $A_5$ | φ80 × 30 | 0.1 | φ80 × 25 | 90 | 0.716 | X |
| $A_6$ | φ80 × 30 | 0.2 | φ80 × 21 | 89 | 0.843 | Δ |
| $A_7$ | φ80 × 30 | 0.3 | φ80 × 18 | 90 | 0.995 | ○ |
| $A_8$ | φ80 × 30 | 2.5 | φ80 × 8 | 88 | 2.188 | ○ |

TABLE 2

| Type of ashes | Dimension before compacting (mm) | Pressing pressure (t/cm$^2$) | Dimension after compacting (mm) | Weight after compacting (g) | Bulk specific gravity of green compact | |
|---|---|---|---|---|---|---|
| $B_1$ | φ80 × 30 | 1 | φ80 × 10 | 73 | 1.452 | ○ |
| $B_2$ | φ80 × 50 | 1 | φ80 × 17 | 118 | 1.381 | ○ |
| $B_3$ | φ80 × 50 | 2 | φ80 × 13 | 115 | 1.760 | ○ |
| $B_4$ | φ80 × 50 | 0.1 | φ80 × 41 | 116 | 0.563 | X |
| $B_5$ | φ80 × 50 | 0.2 | φ80 × 33 | 118 | 0.711 | X |
| $B_6$ | φ80 × 50 | 0.3 | φ80 × 27 | 115 | 0.847 | Δ |
| $B_7$ | φ80 × 50 | 2.5 | φ80 × 11 | 118 | 2.134 | ○ |

Figure 3:
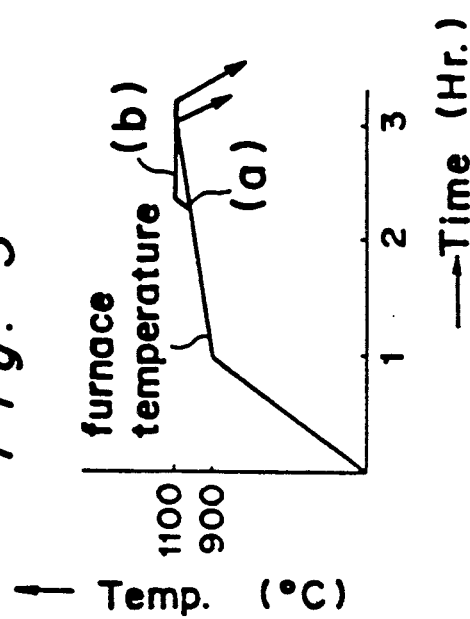
FIG. 3 is a graph showing the furnace temperature of a firing furnace.

When the green compacts S with symbol ○ in Tables 1 and 2, and those with symbol ○ and Δ in Table 2 are fired in a continuous firing furnace 8, with the curve of the furnace temperature shown in FIG. 3, the results are tabulated in Tables 3, 4 and 5.

In other words, in the firing method of FIG. 3, the furnace temperature is rapidly raised until the surface becomes the same as the surface temperature thereof before the surface temperature reaches the softening point, so that the green compact, whether on the surface thereof or in the interior thereof, can pass the softening point almost in the same temperature condition in its entirety to reach 1100° C. During this time, the green compact is fired.

TABLE 3

| Type of ashes | Before firing | | | | | After firing | | |
|---|---|---|---|---|---|---|---|---|
| | Dimension before compacting (mm) | Pressing pressure (t/cm²) | Dimension after compacting (mm) | Weight after compacting (g) | Bulk specific gravity of green compact | Dimension (mm) | Wt. (g) | Bulk specific gravity |
| $A_1$ | $\phi 80 \times 30$ | 1 | $\phi 80 \times 11.5$ | 90 | 1.557 | $\phi 67 \times 9.3$ | 82 | 2.501 |
| $A_4$ | $\phi 80 \times 30$ | 2 | $\phi 80 \times 9$ | 87 | 1.923 | $\phi 67 \times 7.3$ | 80 | 3.108 |
| $A_7$ | $\phi 80 \times 30$ | 0.3 | $\phi 80 \times 18$ | 90 | 0.995 | $\phi 67 \times 14$ | 83 | 1.682 |
| $A_8$ | $\phi 80 \times 30$ | 2.5 | $\phi 80 \times 8$ | 88 | 2.188 | $\phi 67 \times 6.5$ | 80 | 3.491 |

TABLE 4

| Type of ashes | Before firing | | | | | After firing | | |
|---|---|---|---|---|---|---|---|---|
| | Dimension before compacting (mm) | Pressing pressure (t/cm²) | Dimension after compacting (mm) | Weight after compacting (g) | Bulk specific gravity of green compact | Dimension (mm) | Wt. (g) | Bulk specific gravity |
| $B_1$ | $\phi 80 \times 30$ | 1 | $\phi 80 \times 10$ | 73 | 1.452 | $\phi 65 \times 8$ | 69 | 2.599 |
| $B_2$ | $\phi 80 \times 50$ | 1 | $\phi 80 \times 17$ | 118 | 1.381 | $\phi 65 \times 14$ | 113 | 2.432 |
| $B_3$ | $\phi 80 \times 50$ | 2 | $\phi 80 \times 13$ | 115 | 1.760 | $\phi 65 \times 11$ | 110 | 3.014 |
| $B_6$ | $\phi 80 \times 50$ | 0.3 | $\phi 80 \times 27$ | 115 | 0.847 | $\phi 65 \times 23$ | 110 | 1.441 |
| $B_7$ | $\phi 80 \times 50$ | 2.5 | $\phi 80 \times 11$ | 118 | 2.134 | $\phi 65 \times 10$ | 114 | 3.435 |

TABLE 5

| Item | Type of product Burned product of this Invention |
|---|---|
| 1. compressive strength (kg/cm²) | 1200~1600 |
| 2. abrasion loss (g) | 0.02~0.05 |
| 3. transverse strength (kg/cm²) | 100~150 |
| 4. water absorption (%) | 5~7 |
| 5. freezing and thawing test | not abnormal |
| 6. hue of product | identical between internal portion and external portion |

Each of the burned products shown in Tables 3 and 4 is higher in strength than the green compact S, and moreover, 20% lower in volume than the latter, with less weight.

As has been described hereinabove, the green compact of incineration ashes of sewerage sludge according to the present invention is cheaply manufactured without mixing of additives, having the bulk specific gravity of 0.9–2.5. The green compact has the strength necessary for normal handling thereof. Furthermore, the volume of the green compact is reduced to 20–50% im comparison with that of incineration ashes before compacting, and therefore the product is able to be dumped out by a large amount in a predetermined place, accompanied with no fear of generation of the secondary public hazards.

When the above-described green compact is fired to have the bulk specific gravity of 1.4–3.5, the burned product is furthermore reduced in volume and weight, therefore easier to handle. It becomes possible to dump out the burned product by a large amount.

Since the burned product made of dehydrated high polymer cake incineration ashes is free from a crack, it may be turned into bricks or tiles.

Although the present invention has been fully described by way of example with reference to the accompanying drawings, various changes and modifications would be apparent to those skilled in the art. Therefore, unless otherwise such changes and modifications depart from the scope of the present invention, they should be construed as included therein.

What is claimed is:

1. A burned product having a bulk specific gravity of 1.4 to 3.5 obtained by baking a green compact consisting of burnt ashes of sewage sludge having a bulk specific gravity of 0.9 to 2.5.

2. A burned product according to claim 1 having a compressive strength of 1200~1600 kg/cm² and a transverse strength of 100~150 kg/cm².

* * * * *